(12) United States Patent
Olsson

(10) Patent No.: US 9,114,461 B2
(45) Date of Patent: Aug. 25, 2015

(54) DRILL

(75) Inventor: Håkan Olsson, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 418 days.

(21) Appl. No.: 13/343,009

(22) Filed: Jan. 4, 2012

(65) Prior Publication Data

US 2012/0201619 A1 Aug. 9, 2012

(30) Foreign Application Priority Data

Feb. 8, 2011 (SE) ...................................... 1150090

(51) Int. Cl.
*B23B 51/02* (2006.01)
*B24B 19/04* (2006.01)
*B24B 3/32* (2006.01)

(52) U.S. Cl.
CPC . *B23B 51/02* (2013.01); *B24B 3/32* (2013.01); *B24B 19/04* (2013.01); *B23B 2251/082* (2013.01); *B23B 2251/085* (2013.01); *B23B 2251/14* (2013.01); *B23B 2251/241* (2013.01); *B23B 2251/406* (2013.01); *Y10T 408/9097* (2015.01)

(58) Field of Classification Search
CPC ................ B23B 51/02; B23B 2251/12; B23B 2251/125; B23B 2251/406; B23B 2251/408
USPC .......................................... 408/230, 227, 229
See application file for complete search history.

(56) References Cited

U.S. PATENT DOCUMENTS 4,565,473 A * 1/1986 Hosoi ............................ 408/229
4,756,650 A * 7/1988 Wakihira et al. .............. 408/230
5,088,863 A * 2/1992 Imanaga et al. ............... 408/230
5,486,075 A 1/1996 Nakamura et al.
6,916,139 B2 * 7/2005 Yanagida et al. ............. 408/230

(Continued)

FOREIGN PATENT DOCUMENTS

DE 10 2009 056 484 A1 6/2011
EP 2 076 344 7/2009

(Continued)

OTHER PUBLICATIONS

European Search Report for Application No. 12150806.3, dated May 18, 2012.

(Continued)

*Primary Examiner* — Daniel Howell
*Assistant Examiner* — Ryan Rufo
(74) *Attorney, Agent, or Firm* — Morgan, Lewis & Bockius LLP

(57) ABSTRACT

Twist drill for short hole drilling with two chip flutes opening in a clearance surface of a front tip to form, with the clearance surface, two cutting edges. Chip flutes have three different part surfaces having different curvatures—a bottom surface with arc radius less than 10 mm and two other ones with radius of curvature approaching infinity. Boundary line between concave bottom surface and heading frontal surface meets a main edge that is included in the individual cutting edge and divided into two edge segments imparting a J-like shape to the main edge. The chip flute is extraordinary deep with the diameter (DC) of the core reduced to a minimum and the opening angle (α) smaller than the angle of divergence (β) of two bars, between which the flutes are countersunk. The drill improves-formation and evacuation of chips, is easy-cutting and requires a minimum of energy.

20 Claims, 12 Drawing Sheets

(56) References Cited

U.S. PATENT DOCUMENTS

| | | | |
|---|---|---|---|
| 2004/0101379 A1* | 5/2004 | Mabuchi et al. | 408/230 |
| 2009/0279965 A1* | 11/2009 | Soittu | 408/59 |
| 2009/0317202 A1* | 12/2009 | Zhu | 408/230 |
| 2010/0092259 A1 | 4/2010 | Borschert et al. | |
| 2011/0081215 A1* | 4/2011 | Nakamura et al. | 408/230 |
| 2011/0170973 A1 | 7/2011 | Von Puttkamer et al. | |
| 2011/0268518 A1* | 11/2011 | Sampath et al. | 408/59 |

FOREIGN PATENT DOCUMENTS

| | | | | |
|---|---|---|---|---|
| EP | 2 213 397 A1 | | 8/2010 | |
| JP | 61-109606 | * | 5/1986 | B23B 51/02 |
| JP | 61-89416 | | 6/1986 | |
| JP | 02-036010 | * | 2/1990 | B23B 51/02 |
| JP | 2002-126924 | * | 5/2002 | B23B 51/00 |
| WO | WO 02/28599 A2 | | 4/2002 | |
| WO | WO 2009/138064 A1 | | 11/2009 | |

OTHER PUBLICATIONS

Kenna Universal—Solid Carbide Drills, Cutting Data Recommendations for B966 Kenna Universal Drills (2 pages).

Written Opinion for European Application No. 12150806.3, dated Jun. 4, 2012.

* cited by examiner

DRILL

RELATED APPLICATION DATA

This application is based on and claims priority under 37 U.S.C. §119 to Swedish Application No. 1150090-7, filed Feb. 8, 2011, the entire contents of which are incorporated herein by reference.

FIELD OF THE DISCLOSURE

The present disclosure relates to relates to a drill of the type that comprises front and rear ends, between which there extends a centre axis with which a peripheral envelope surface is concentric, and the front one of which is formed as a tip having an obtuse nose angle, as well as two chip flutes countersunk in the envelope surface, which flutes are situated between a pair of bars and run helicoidally at a certain pitch angle around a central core, and individually are delimited by a chute-shaped flute wall situated between a pair of parallel border edges, a first one of which is heading in the direction of rotation of the drill and the second one trailing, wherein

- a) between the individual chip flute and a clearance surface included in the tip, there is formed a cutting edge that extends from the centre axis to the periphery and has a shape that is dependent upon the cross-sectional shape of the flute wall as well as upon the nose angle,
- b) the flute wall includes, on one hand, a frontal surface that is situated closest to the first border edge and extends axially rearward from a main edge included in the cutting edge, and on the other hand a trailing surface situated closest to the second border edge, which trailing surface transforms into the frontal surface via a concavely arched bottom surface and extends rearward from a web thinning formed in the tip and located adjacent to a centre cutting edge, which transforms into the main edge via a knee and is shorter than the same,
- c) a radial angle between the frontal surface and a radial reference line between the centre axis and the first border edge is positive so far that the frontal surface is situated rotationally behind the reference line, and
- d) the individual chip flute has an opening angle—counted as the angle between said first reference line and a second reference line between the centre axis and the second border edge—with which an angle of divergence of the individual bar forms the supplementary angle.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Drills of the above-related kind, which belong to the category of short hole drills, and which, as a consequence of the shape of the chip flutes, commonly are denominated twist drills, are used to recess holes by cutting or chip removing machining in workpieces of metal, such as steel, aluminium, cast iron, etc. The drills may also be used for hole making in different forms of composite material.

Of great importance to the quality of the completed hole in respect of dimensional accuracy and surface smoothness is the formation and evacuation, respectively, of the chips. Namely, if the chips tend to be pressed out towards the generated hole wall, its surface quality is deteriorated. In severe cases, the chips may entangle each other and cause chip jammings, which in the worst case may lead to tool breakdown as well as rejection of the workpiece. Thus, there is a general aim to construct the drills so that a flexible chip evacuation is guaranteed. Another aim is to provide drills that are easy-cutting not only with the purpose of guaranteeing good hole quality, but also of reducing the energy consumption and the time required for the hole-making operation.

SUMMARY

An exemplary embodiment of a drill comprises front and rear ends, a centre axis (C) extending between the front and rear ends and with which a peripheral envelope surface is concentric, and the front one of which is formed as a tip having an obtuse nose angle (c), two chip flutes countersunk in the peripheral envelope surface, which flutes are situated between a pair of bars and run helicoidally at a certain pitch angle ($\phi$) around a central core, and individually are delimited by a chute-shaped flute wall situated between a pair of parallel border edges, a first one of which is heading in the direction of rotation of the drill and the second one trailing, wherein a) between the individual chip flute and a clearance surface included in the tip, there is formed a cutting edge that extends from the centre axis (C) to the periphery and has a shape that is dependent upon the cross-sectional shape of the flute wall as well as upon the nose angle ($\epsilon$), b) the flute wall includes, on one hand, a frontal surface that is situated closest to the first border edge and extends axially rearward from a main edge included in the cutting edge, and on the other hand a trailing surface situated closest to the second border edge, which trailing surface transforms into the frontal surface via a concavely arched bottom surface and extends rearward from a web thinning formed in the tip and located adjacent to a centre cutting edge, which transforms into the main edge via a knee and is shorter than the same, c) a radial angle ($\delta$) between the frontal surface and a radial reference line (RL1) between the centre axis (C) and the first border edge is positive so far that the frontal surface is situated rotationally behind the reference line, d) the individual chip flute has an opening angle ($\alpha$)—counted as the angle between the first reference line (RL1) and a second reference line (RL2) between the centre axis (C) and the second border edge, with which an angle of divergence ($\beta$) of the individual bar forms the supplementary angle, e) the core has a diameter (DC) that amounts to at most 22% of the drill diameter (D), f) the angle of divergence ($\beta$) of the bar is greater than the opening angle ($\alpha$) of the chip flute, g) the frontal and trailing surfaces of the individual flute wall are delimited from the bottom surface via imaginary, helicoidal boundary lines, and have radii of curvature ($r_1$, $r_2$) as viewed in a plane perpendicular to the centre axis that are many times greater than the radius ($r_3$) of the bottom surface, and h) a first boundary line, positioned closest to the first border edge, meeting the main edge in a point that divides the same into two edge segments, the one of which positioned closest to the centre cutting edge has the smallest radius of curvature and imparts a J-like shape to the main edge.

BRIEF DESCRIPTION OF THE DRAWING

The following detailed description of preferred embodiments can be read in connection with the accompanying drawings in which like numerals designate like elements and in which.

DETAILED DESCRIPTION

General Description of the Construction of Twist Drills

Figure 1:
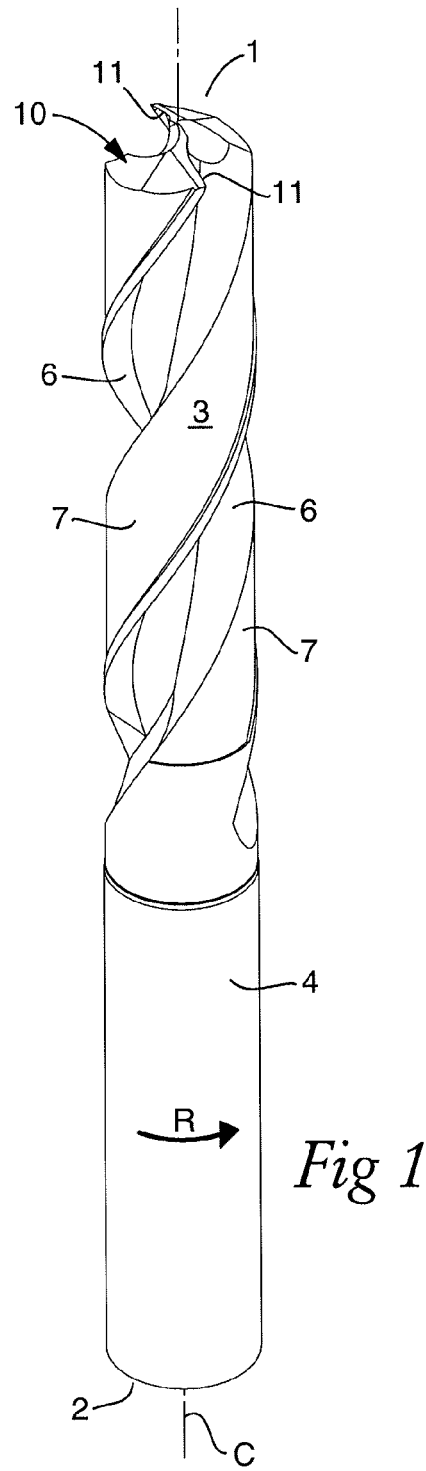
FIG. 1 shows is a perspective view of an exemplary embodiment of a twist drill.
Figure 2:
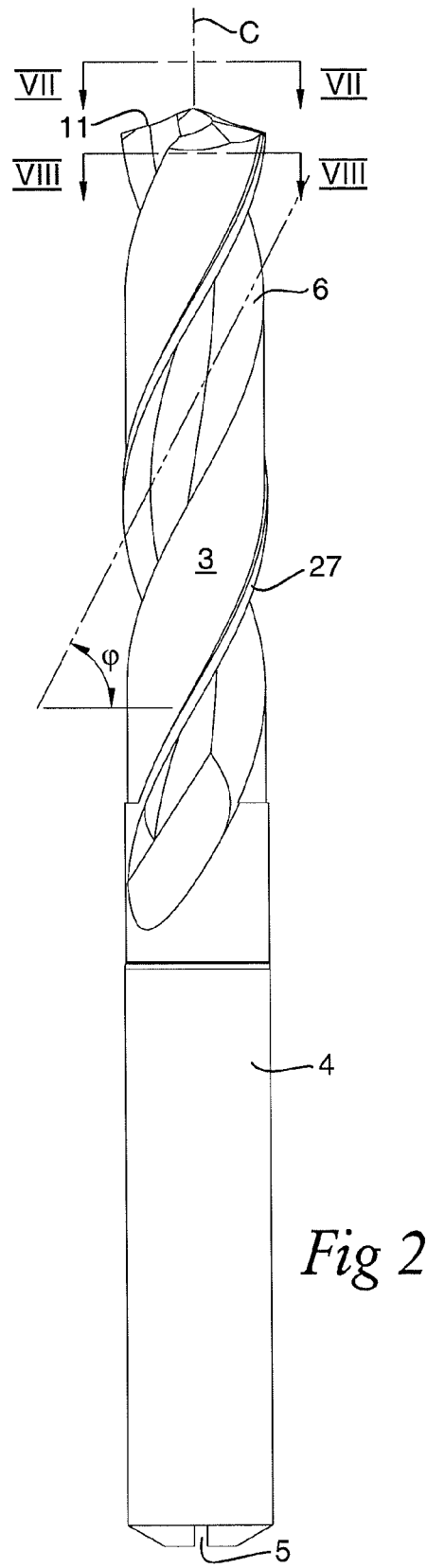
FIG. 2 is a view from the side of the same drill.

The twist drill shown in FIGS. 1 and 2 includes front and rear ends 1, 2, between which there extends a centre axis C with which a rotationally symmetrical envelope surface 3 is concentric. The front end 1 is shaped as a tip that tapers in the forward direction. The rear part 4 of the drill adjacent to the end 2 is intended to be attached in a driving machine and includes means—in this case a groove 5—for the transfer of torque from the machine to the drill. In the envelope surface 3 along the front part of the drill, two chip flutes 6 are countersunk, which are situated between a pair of bars 7 and run helicoidally around a central core 9 (see FIG. 8).

In the front end or tip 1, a clearance surface in its entirety designated 10 is included, in which the two chip flutes 6 open so as to form, together with the clearance surface, a pair of cutting edges 11.

Figure 7:
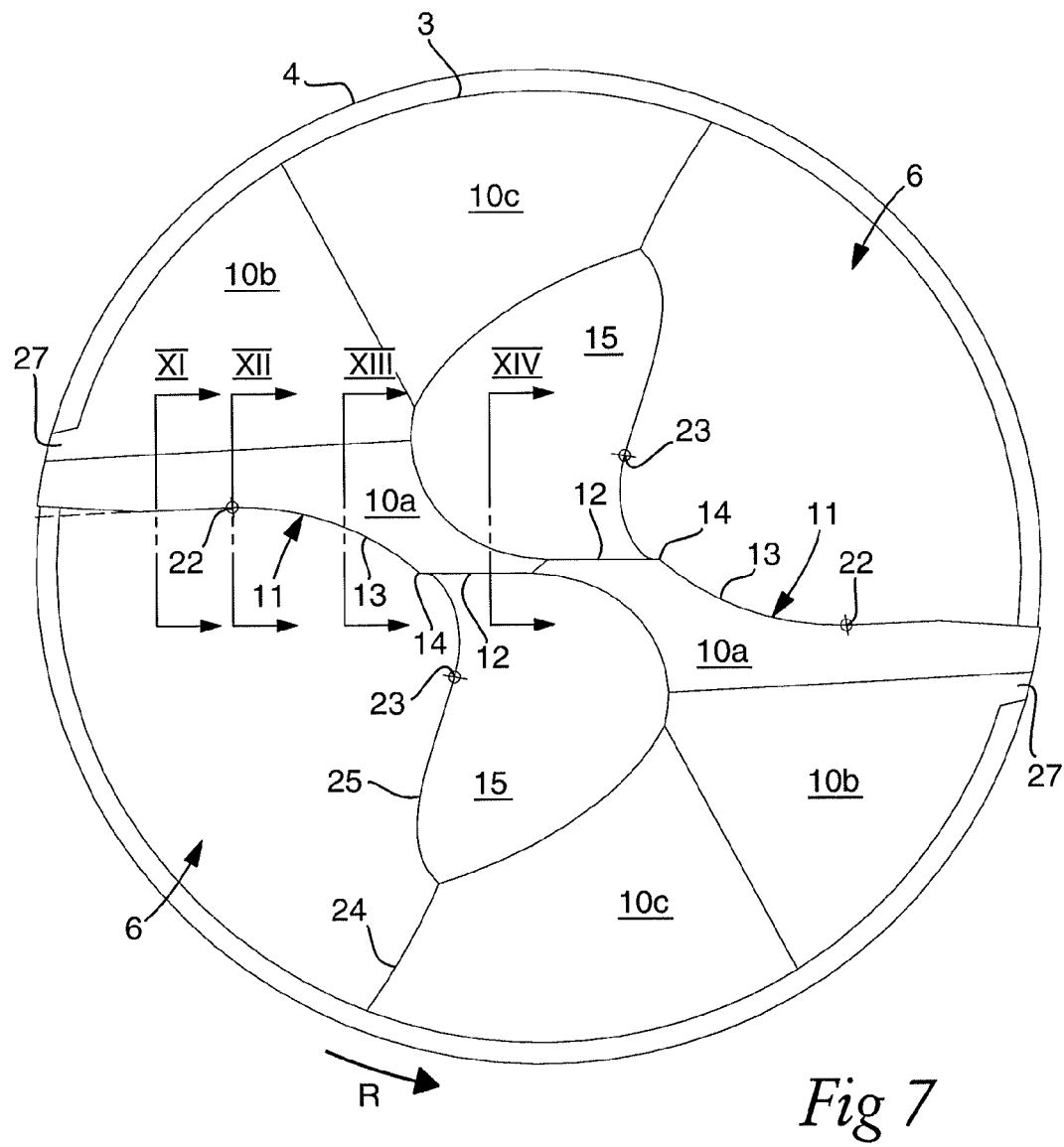
FIG. 7 is an enlarged end view VII-VII in FIG. 2 showing the drill axially from the front.
Figure 8:
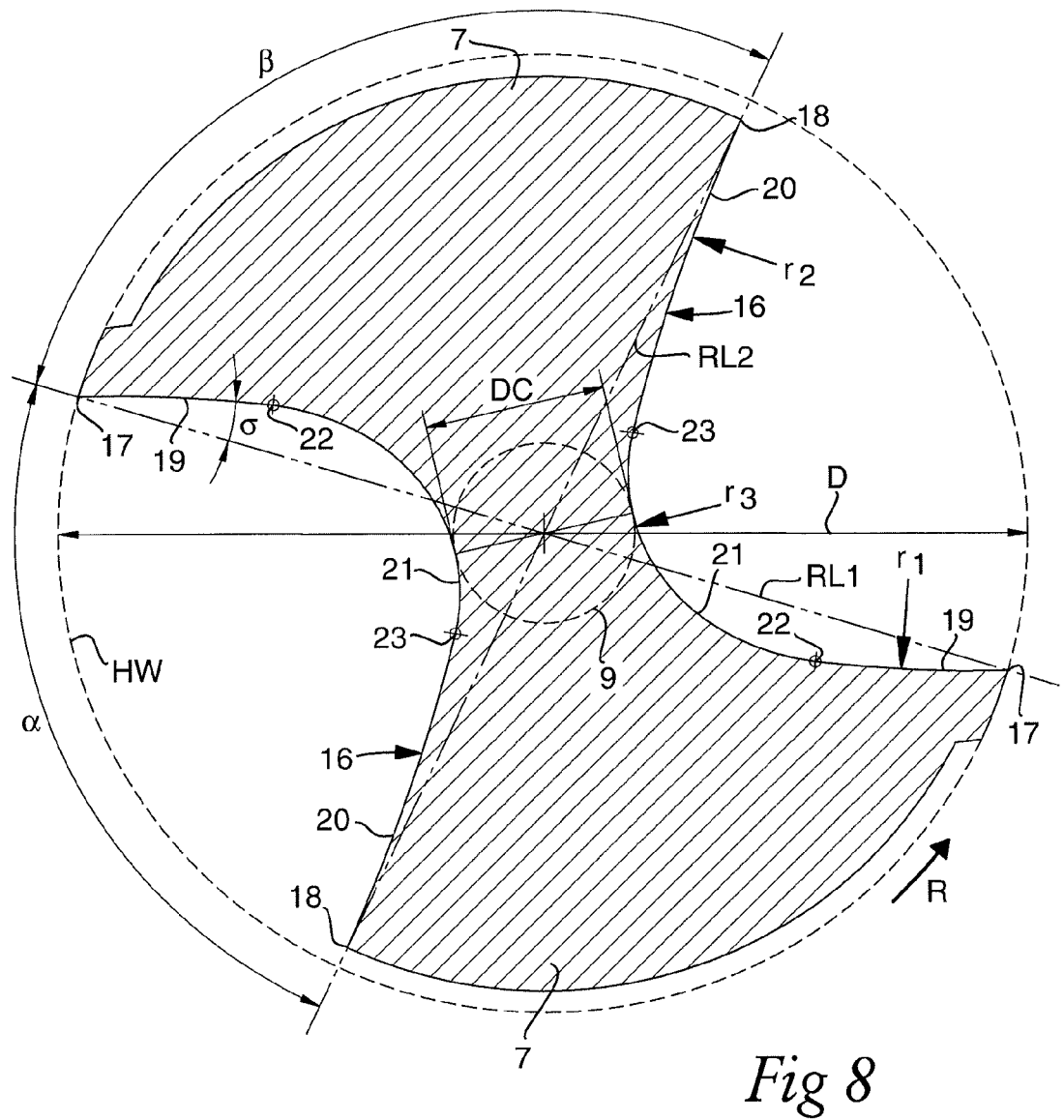
FIG. 8 is an enlarged cross-section VIII-VIII in FIG. 2 together with certain geometrical data characteristic of an exemplary embodiment of a drill.

Already here, it should be pointed out that the invention and the technical advantages thereof in comparison with previously known drills, involve an advanced solid geometry in the light of all limiting surfaces and boundary lines along the drill being arched/curved, at times in several dimensions in the room. Particular attention is directed to FIGS. 7 and 8, the first-mentioned one of which is an end view in which the drill is regarded axially from the front (downward in FIG. 2), while FIG. 8 is a cross-section (VIII-VIII in FIG. 2), which is situated perpendicular to the centre axis C. The cross-sectional shape of the chip flutes 6 according to FIG. 8 is of great importance to the shape of the individual cutting edge 11, as this is regarded in FIG. 8. However the last-mentioned one is also influenced by other factors, viz. the nose angle of the drill and the pitch angle of the chip flute.

Each individual cutting edge 11 (see FIGS. 3-6) includes a relatively short centre cutting edge 12 as well as a longer main edge 13 that transforms into the centre cutting edge via a so-called knee 14 and extends radially outward from the same up to the periphery of the drill. In a view perpendicular to the centre axis (C) (as in FIGS. 5A and 5B), the projection of an imaginary line 30 extending from the centre cutting edge 12 intersects the centre axis (C) at a first axial position 31 and the projection of an imaginary line 32 extending from the main edge 13 intersects the centre axis (C) at a second axial position 33 that is axially rearward from the first axial position 31. In the tip 1, there is also included a so-called web thinning 15 that is required to form the centre cutting edge 12. In the example, the centre cutting edge 12 is straight.

In order to provide conceptual clarity, it should be pointed out that the denomination "chip flute" relates to the vacant space that is delimited by a flute wall, which in FIG. 8 is generally designated 16. This flute wall 16 extends between two parallel, helicoidal border edges 17, 18, a first one (17) of which is rotationally heading on its bar 7, while the second 18 is trailing on its bar.

In FIG. 8, α designates the opening angle of the chip flute 6, while β designates the angle of divergence of the bar 7. These angles α, β are determined between two diametrical reference lines RL1 and RL2, which are radial, i.e., situated in one and the same plane perpendicular to the centre axis C, and the first-mentioned one of which extends diametrically between the border edges 17 and the last-mentioned one of which between the border edges 18, as well as intersect each other in the centre axis C.

In FIG. 2, φ designates the pitch angle of the individual chip flute. The nose angle of the drill is shown in FIG. 5 and designated ε.

PRIOR ART

Figure 15:
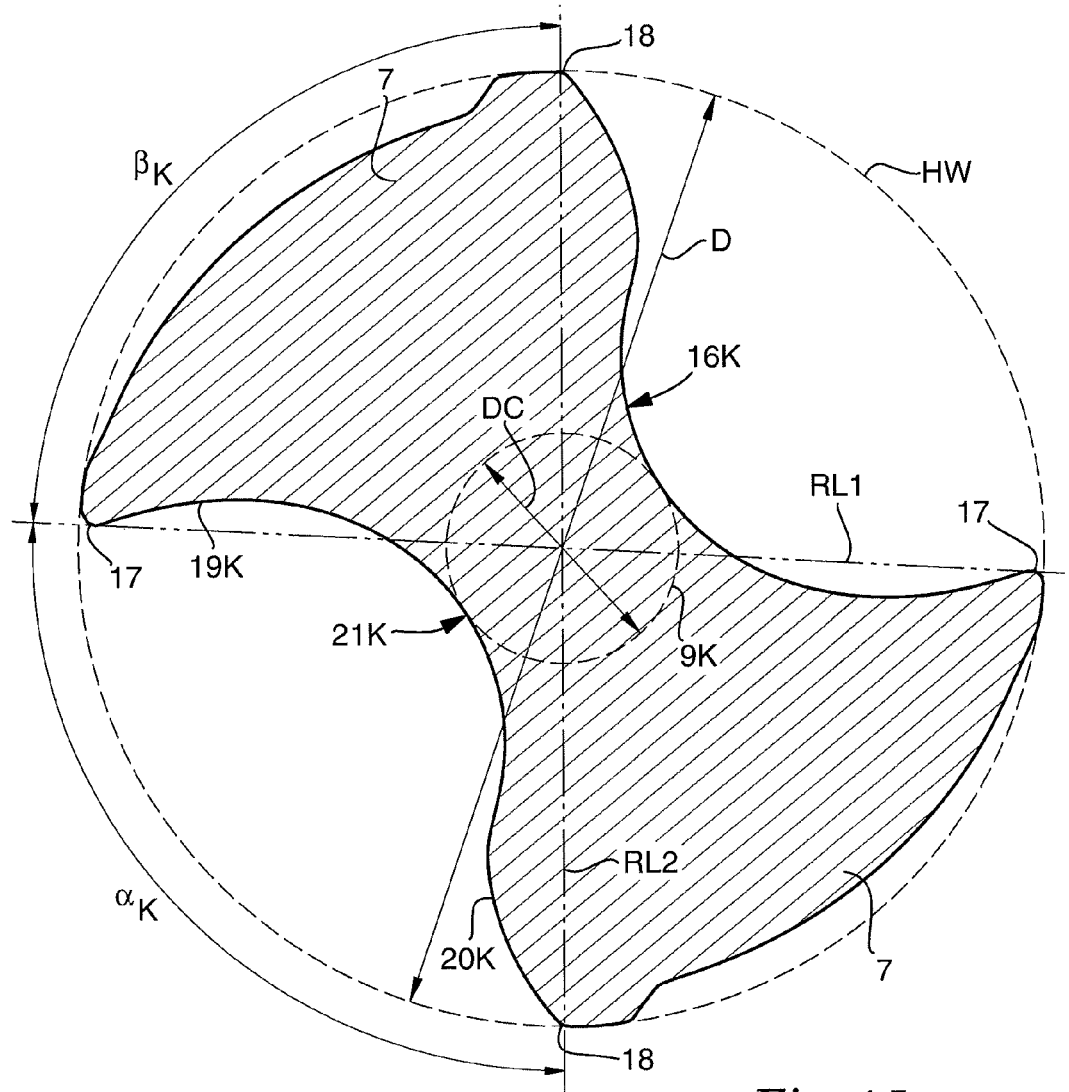
FIG. 15 is a cross-section corresponding to FIG. 8 and showing the cross-sectional shape of a previously known drill.

In FIG. 15, there is illustrated the cross-sectional shape of a drill that is previously known by open use (marketed by Kennametal Inc. under the name KENNA UNIVERSAL™ drills B966 series). In this case, the flute wall 16K has a wave-like or billowy cross-sectional shape by including two part surfaces, viz. a concave part surface 19K adjacent to a first, heading border edge 17, and a convex part surface 20K adjacent to the second, trailing border edge 18. Henceforth, said part surfaces 19K, 20K are denominated frontal surface and trailing surface, respectively. A third, bottom-forming part surface 21K having a concave shape is present between the frontal surface 19 and the trailing surface 20 and transforms via tangential points into the last-mentioned ones. The deepest lying point along the bottom surface 21K is tangent to a core 9K, which delimits the bars 7 from each other. In order to give the drill sufficient strength, it is necessary to give said core 9 a comparatively large diameter DC. More precisely, in the present drill, DC amounts to 25% of the drill diameter D.

As a consequence of the wave-like or billowy shape of the flute wall 16, the chip channel, which is delimited between the flute wall and the hole wall (outlined by means of the dashed arc line HW), obtains a generally elongate, slightly pear-like cross-sectional shape, in that the length of the chip channel, such this is counted between the two border edges 17, 18, is considerably greater than the width or the depth counted as the greatest radial distance between the bottom surface 21K and the arc line HW. Thus, the chip channel is fairly narrow and entails in practice that the chips removed by the cutting edge tend to be pressed out against the hole wall HW, rather than being conveyed in the tangential direction by the frontal surface 19K.

Objects and Features:

The present invention aims at obviating the above-mentioned chip evacuation problems of the previously known drill and at providing an improved drill of short hole type. Therefore, a primary object is to provide a drill, by means of which the chips to the greatest possible extent are formed and retained in the chip flute without being pressed out toward the hole wall. Another object is to provide a drill that is easy-cutting and thereby energy-efficient, and that reduces the operation time for the recession of a hole.

Figure 16:
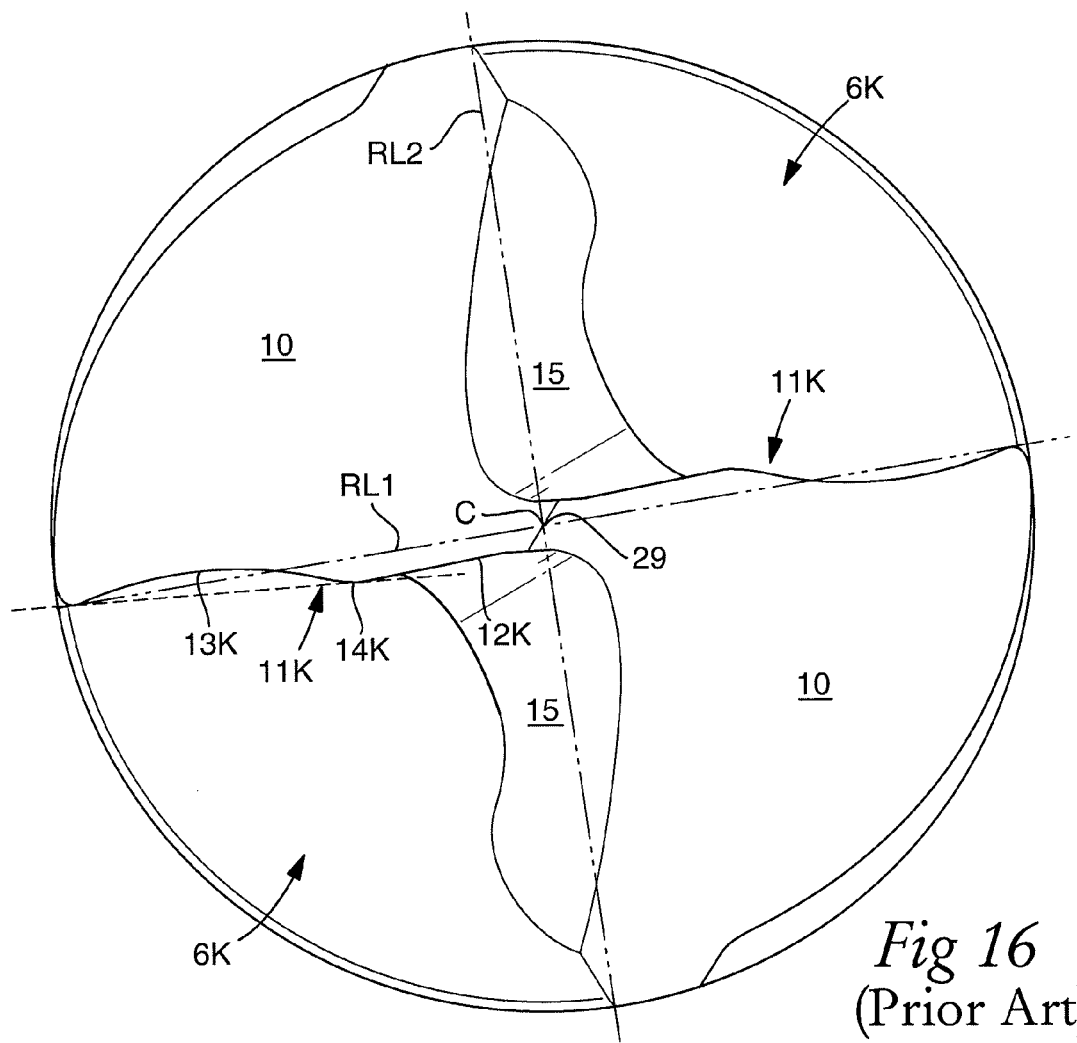
FIG. 16 is an end view corresponding to FIG. 7 and showing the known drill from the front.
Figure 17:
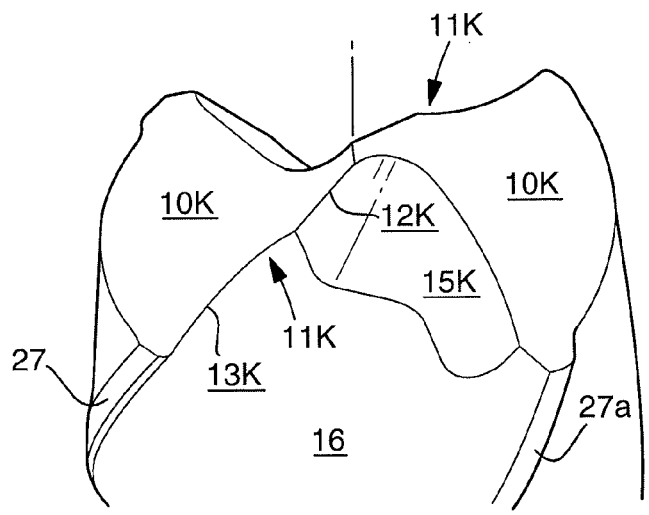
FIG. 17 is a partial perspective view showing the tip of the known drill.

Detailed Description of a Preferred Embodiment of the Drill:

Reference is now made to FIGS. 3-14, which in detail illustrate the design of an exemplary embodiment of a drill and explain the differences between this and the known drill according to FIGS. 15-17. Primarily, the drill according to the invention differs from the known one in the design of the chip flutes 6. Thus, as is seen in FIG. 8, in the present case, the individual flute wall 16 is formed with two part surfaces situated adjacent to the border edges 17, 18, viz. a frontal surface 19 and a trailing surface 20, which transform into a common, concavely arched bottom surface 21 having another curvature than the part surfaces 19, 20. Simultaneously, the opening angle α of the individual chip flute is, in this case, smaller than the angle of divergence β of the bar 7. More precisely, in the shown, preferred example, a amounts to 84°, while β, which is the supplementary angle of α, amounts to 96°.

Figure 3:
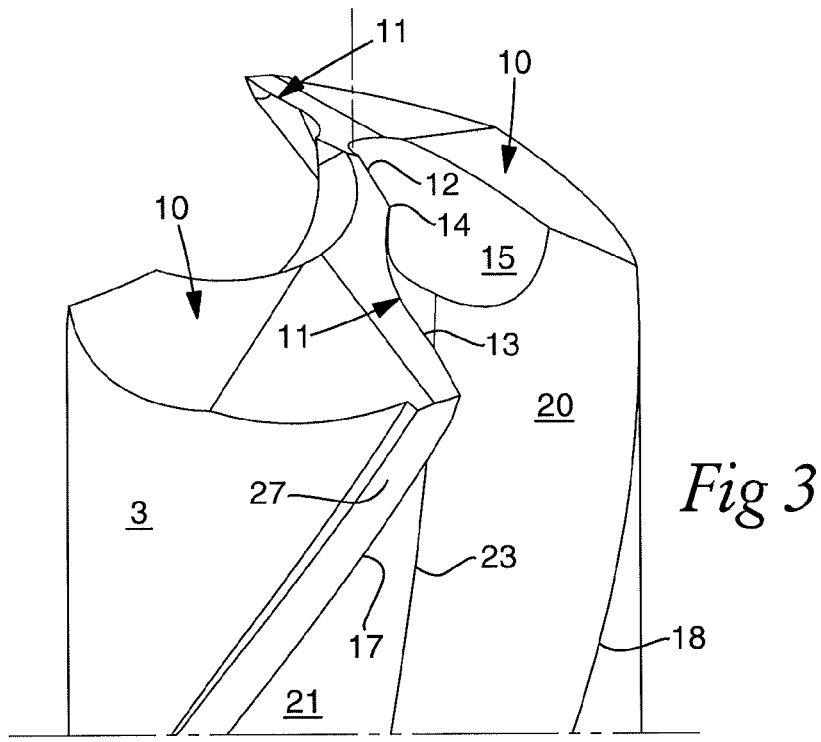
FIG. 3 is an enlarged bird's eye view of the front part of the drill adjacent to its tip.
Figure 5A:
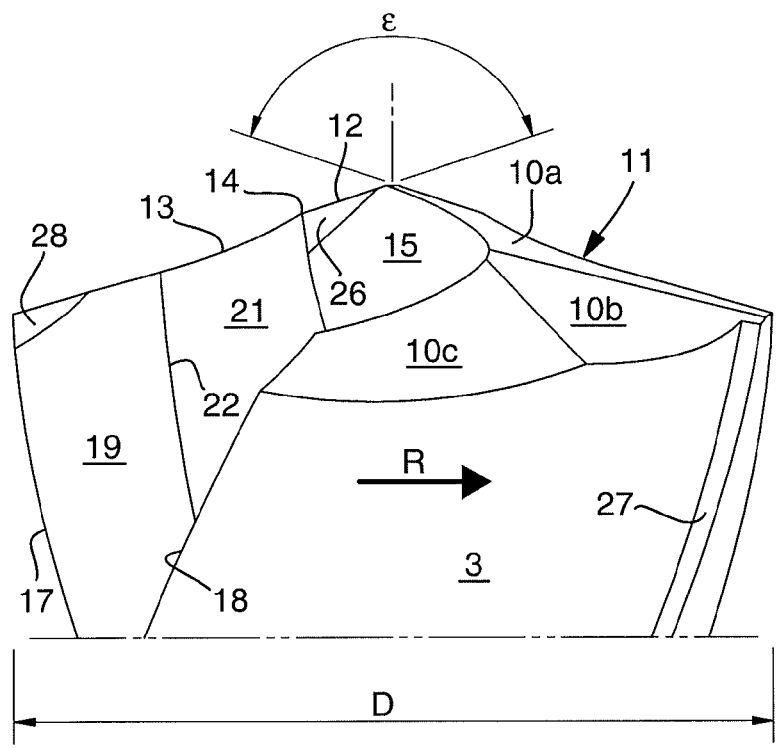
FIG. 5A is a partial side view showing the front part of the drill and FIG. 5B is the same partial side view showing the projection of an imaginary line extending from the centre cutting edge intersecting the centre axis at a first axial position and the projection of an imaginary line extending from the main edge intersecting the centre axis at a second axial position.
Figure 5B:
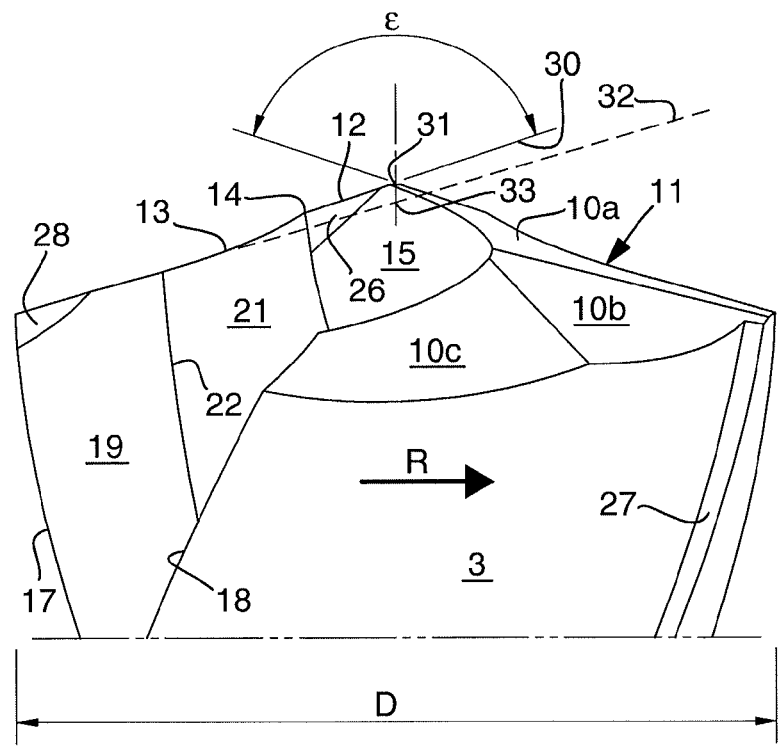
Figure 6:
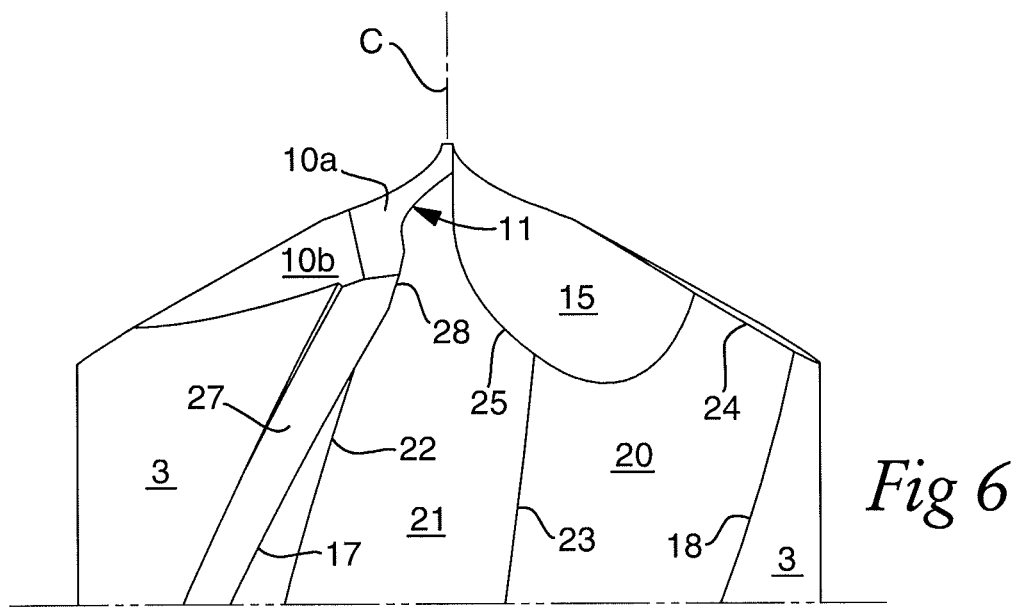
FIG. 6 is a side view showing the drill rotated 90° in relation to FIG. 5.

The frontal surface 19 transforms into the concave bottom surface 21 via a first boundary line 22 (see FIGS. 4 and 5), while the trailing surface 20 in turn transforms into the bottom surface 21 via a second boundary line 23 (see also FIGS. 3 and 6).

In the clearance surface 10, in this case, three different part surfaces are included, viz. a primary clearance surface 10a, a secondary clearance surface 10b, and a tertiary clearance surface 10c. These part surfaces, which in the example are plane, are ground-in or in another way formed in successively increasing clearance angles from the cutting edge 11. Thus, the clearance angle of the surface 10a is smaller than the clearance angle of the surface 10b, which in turn is smaller than the one of the surface 10c. In other words, the part of the clearance surface 10 positioned behind the cutting edge 11 falls in its entirety away from the cutting edge 11 to a rotationally rear boundary line 24, along which the tertiary clearance surface 10c transforms into a chip flute. Here, it should be noted that the drill is rotatable in the direction of rotation R.

Figure 4:
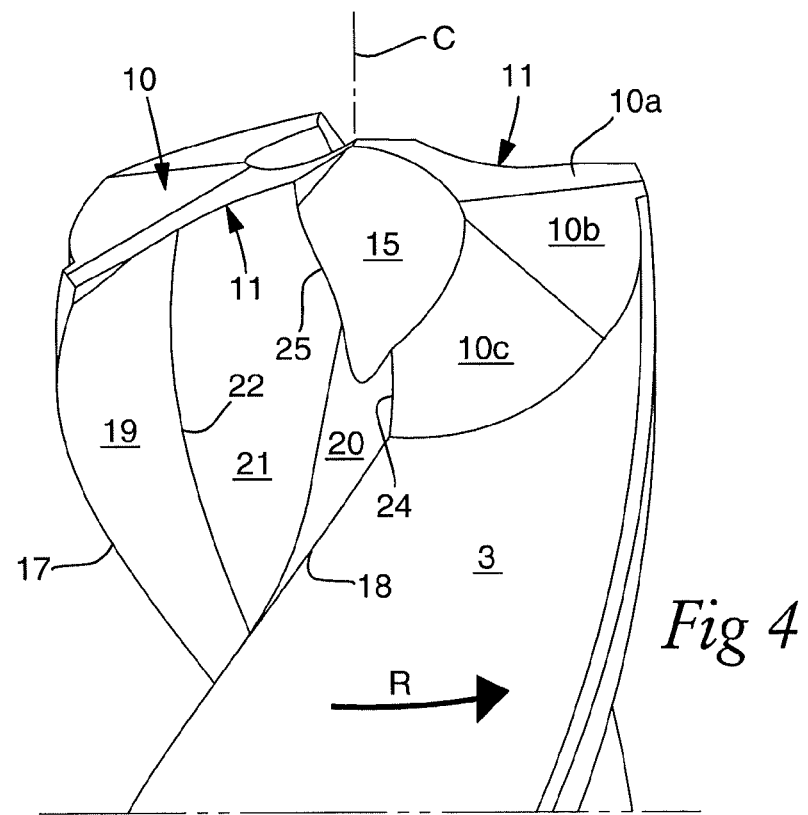
FIG. 4 is an analogous bird's eye view, in which the drill has been rotated 90° in relation to FIG. 3.

In order to form the centre cutting edge 12, it is necessary to, in the drill tip 1, grind in the aforementioned web thinning 15 in the form of a concave, countersunk surface, which transforms into the different clearance part surfaces 10a, 10b and 10c, as well as into the rotationally trailing chip flute 6 via a boundary line 25 (see FIG. 4). The depth of the web thinning 15 increases successively in the direction from the cutting edge 11 toward the rear boundary line 25. By selecting a suitable shape of the grinding disc that is used to form the web thinning 15, a wedge-shaped, plane surface 26 can be provided adjacent to the arched web thinning surface, the surface 26, together with the rotationally trailing, primary clearance surface 10a, forming the centre cutting edge 12. In other words, the wedge surface 26 serves as a chip surface, against which a radially inner part of the chip is removed.

Along each heading border edge 17, there is a guide pad 27 having the purpose of guiding the drill so that the same is held centred in the recessed hole. To a certain extent, the guide pad 27 also contributes to level the surface of the generated hole wall HW. The drill diameter D (see FIG. 8) is defined by the diametrical distance between the outsides of the guide pads.

Fundamental to the invention is that the two outer part surfaces 19, 20 of the flute wall 16 have another curvature than the inner bottom surface 21 delimited via the boundary lines 22, 23. While the last-mentioned one is markedly concave—by being defined by an arc line having a comparatively small radius $r_3$ in the section according to FIG. 8—the other part surfaces 19, 20 have another, less curved curvature. The shape of the chip flute wall in is its entirety determined in two different co-ordinate directions, viz. axially in the longitudinal direction of the drill as well as cross-sectionally in arbitrary planes perpendicular to the centre axis C. The axial shape is defined by the general screw or helix shape of the chip flute, while the cross-sectional shape is defined by the three lines or generatrices, which are shown in the plane perpendicular to the centre axis C in FIG. 8. Among these, the generatrix defining the markedly concave shape of the bottom surface has a comparatively small radius $r_3$, while the radii $r_1$, $r_2$ of the two other generatrices are many times greater. The expression many times greater means that the radii $r_1$ and $r_2$ respectively, should be at least three times greater than the radius $r_3$. If $r_1$ and $r_2$, as is the case in the embodiment example, approach infinity, said generatrices will be approximately straight, which means that the edge segment 13a as well as the rear boundary line 24 of the clearance surface 10 become essentially straight. Where the boundary line 22 meets the main edge 13 (see FIGS. 7 and 9), this will be divided into two separated edge segments, viz. an essentially straight edge segment 13a (FIG. 9) that connects to the frontal surface 19, and a curved edge segment 13b adjacent to the bottom surface 21. Together, these edge segments 13a, 13b impart a slightly J-like shape to the main edge 13, when the same is seen in an end view (FIG. 7).

Already here, it should be pointed out that a so-called reinforcement bevel 28 is ground-in in the radially outer corner in which the frontal surface 19, the primary clearance surface 10a, and the outside of the guide pad 27 meet each other. This reinforcement bevel, which is in the form of a diminutive, triangular surface, serves to reduce the rake angle in the corner and entails that the very outermost part of the edge segment 13a deviates somewhat in the backward direction in the direction of rotation (see FIG. 9). Immediately behind the reinforcement bevel 28, as viewed in the axial direction of the drill, the frontal surface 19 is however defined by essentially straight generatrices out to the periphery (see FIG. 8). Along the reinforcement bevel 28, the rake angle (not shown) is smaller than along the rest of the edge segment 13a. More precisely, in the example, the same is constant and amounts to 17°.

Reference is now made to FIGS. 11-14, which illustrate how the axial rake angle γ of the individual main edge 13 is positive and decreases successively from the periphery toward the centre of the drill. In the example, γ amounts to 23.3° in the section XI-XI (see FIG. 7), to 19.1° in the section XII-XII, and to 14.6° in the section XIII-XIII. However, the rake angle of the centre cutting edge 12 is approximately 0°, i.e., the chip surface 26 forms approximately an angle of 90° with the surface being machined. Furthermore, the radial angle of the cutting edge, such as this is shown in the form of the angle δ between the frontal surface 19 and the reference line RL1 in FIG. 8, is positive so far that the frontal surface is located rotationally behind the reference line. Although δ may vary, the same should be within the range of 5-17°, suitably 7-15°. In the example, δ amounts to 11°.

By combining an ample radial rake angle (δ) with a radially outwardly successively increasing axial rake angle (γ)—which is a natural consequence of the screw shape of the chip flute—it is guaranteed that the cutting edge becomes easy-cutting along the larger part of the hole bottom surface swept over by the same at the same time as its strength increases toward the centre of the drill, where the stresses are the greatest and the cutting edge needs its greatest strength. In this connection, it should be pointed out that the part of the hole bottom surface swept over by the main edge 13 is many times greater than the central part swept over by the centre cutting edge 12. In the example, the first-mentioned one is approx. 25 times greater than the last-mentioned one.

By the cutting edge 11 having been made extraordinarily easy-cutting, the diameter DC of the core 9 can be reduced to an absolute minimum without the strength of the drill being jeopardized. In the shown prototype embodiment, the drill diameter D amounts to 16.5 mm and the width of the chip flute between the border edges 17, 18 to 12 mm. In this case, it has been possible to give the core 9 such a limited diameter as 3.05 mm. In other words, DC is less than 20% of D. In practice, DC may be made up to 22% of D. On the other hand, DC should not be smaller than 17% of D. Most suitably, DC is within the range of 18-20% of D. By the core having such a small diameter DC, the depth of the chip flute 6 has been possible to be maximized to an extent that previously has not been considered realistic.

For the sake of completeness, it should be mentioned that the diameter of the drill along the envelope surface 3 amounts to 15.3 mm (i.e., the guide pads 27 have a thickness of 0.6 mm), and that the length of the drill amounts to 143 mm. Then, the length of the chip flutes is 92 mm.

Figure 19:
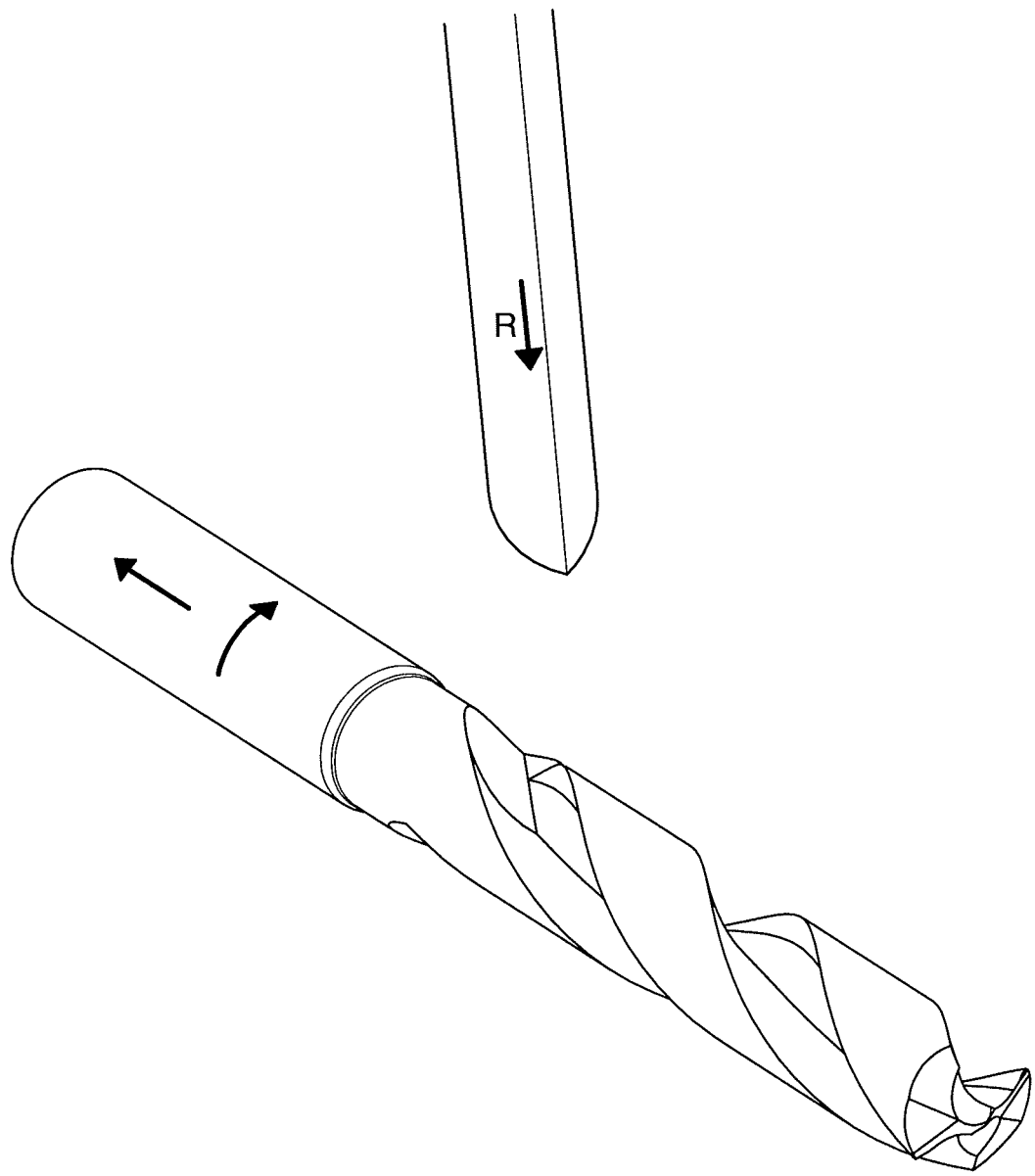
FIG. 19 is a perspective sketch illustrating a moment in the manufacture of the drill.

The manufacture of the drill is usually carried out by grinding a rod-shaped workpiece, e.g. of cemented carbide or steel. If the drill should have flushing fluid channels, through, axial holes are drilled in the workpiece, after which the same is rotated so that the flushing fluid channels will follow the helicoidal bars of the completed drill. In a first grinding operation (see FIG. 19), the workpiece and a rotatable grinding disc are brought to move in relation to each other. More precisely, the workpiece is tilted in relation to the grinding disc and is fed forward axially at the same time as the grinding disc rotates. In such a way, a peripheral portion of the grinding disc will generate the concave bottom surface at the same time as essentially straight generatrices, along opposite sides of the grinding disc, generate the frontal and trailing surfaces 19, 20, respectively, of the chip flutes. In a number of concluding operations, the different part surfaces of the clearance surface 10 are ground, the primary clearance surface 10a of which forms the main edge 13 of the cutting edge together with the frontal surface 19 and bottom surface 21 of the flute wall 16. In addition, the centre cutting edge 12 is ground out by grinding-in of the web thinning 15. Where the central parts of the two primary clearance surfaces 10a meet each other, a central chisel edge 29 (see FIG. 9) is formed, which is the part of the drill tip 1 that first enters the workpiece.

In the embodiment shown, the pitch of the chip flutes 6 is uniform along their entire extension. Within the scope of the invention, the chip flutes may, however, in a known way per se, be formed with a pitch that increases toward the rear end of the drill, more precisely with the purpose of additionally facilitating the chip evacuation.

It should furthermore be pointed out that the primary clearance part surface 10a in the example is shown to be plane, which means that the clearance angle is constant along the entire length of the cutting edge from the centre to the periphery. However, it is also feasible to give the primary clearance surface a slightly arched or cambered shape in order to provide varying clearance angles in different parts of the cutting edge, more precisely clearance angles that increase in the direction from the periphery toward the centre. In such a way, good clearance is attained also from the centre cutting edge 12.

Figure 9:
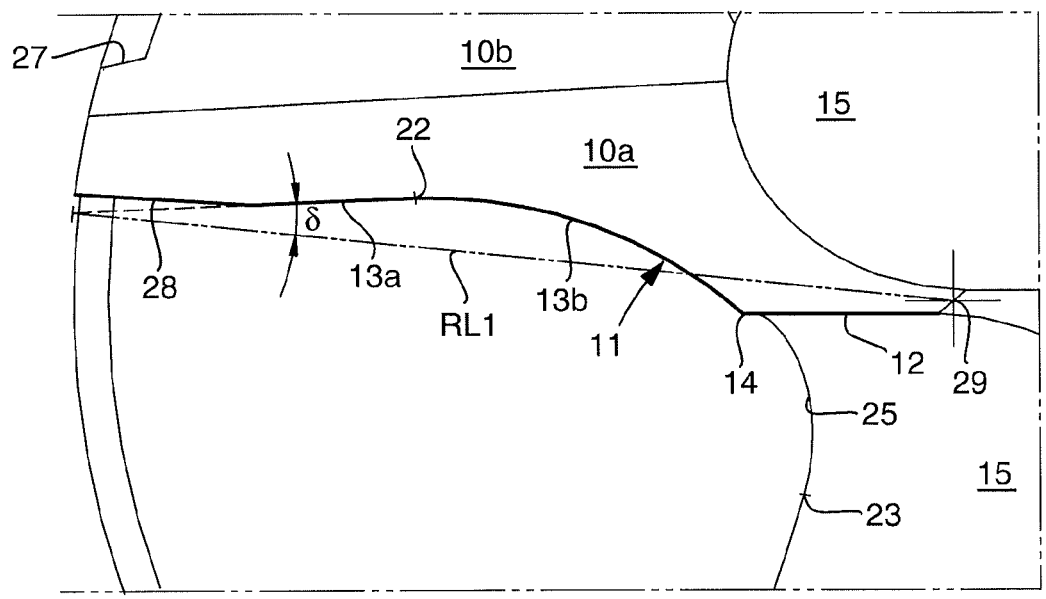
FIG. 9 is an enlarged segment from FIG. 7 showing the nature of a cutting edge included in the drill.
Figure 10:
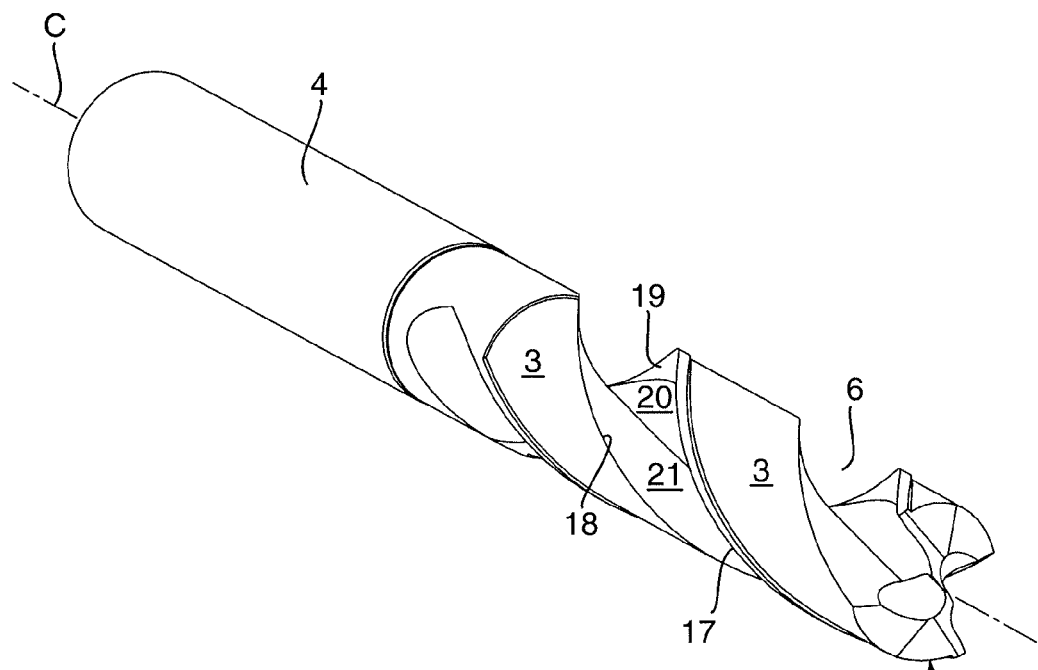
FIG. 10 is an additional perspective view of the drill.
Figure 11:
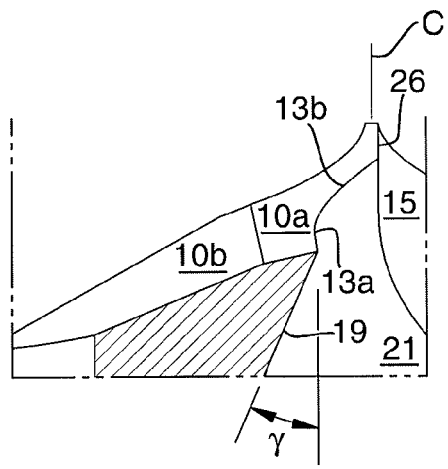
FIG. 11 is a section XI-XI in FIG. 7.
Figure 12:
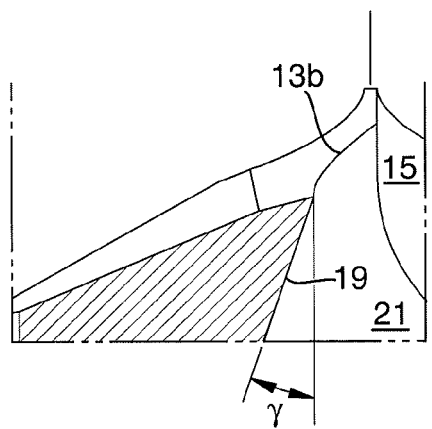
FIG. 12 is a section XII-XII in FIG. 7.
Figure 13:
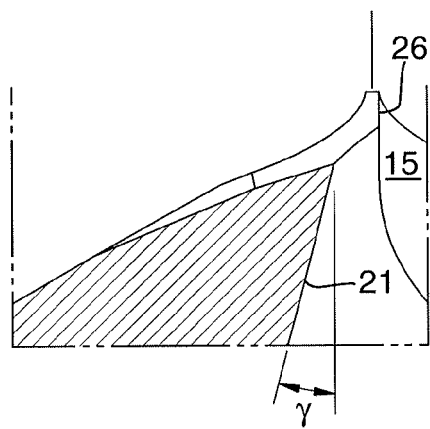
FIG. 13 is a section XIII-XIII in FIG. 7.
Figure 14:
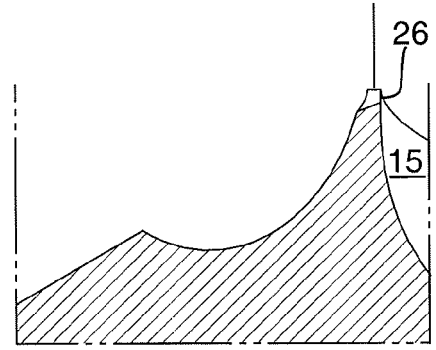
FIG. 14 is a section XIV-XIV in FIG. 7.

The arc-shape of the edge segment 13b shown in FIG. 9 is, as pointed out previously, depending upon the arc-shape of the chip flute bottom surface 21 in the section VIII-VIII as well as upon the nose angle ε. More precisely, the shape of the edge segment 13b follows closer the curved shape of the bottom surface 21 the greater the nose angle ε is, and vice versa. In the example, the nose angle ε amounts to 152°, although the same may vary upward as well as downward from this value. However, ε should amount to at least 120° (most acute) and at most 175° (most obtuse). Suitably, ε is within the interval of 130-170°.

As pointed out previously, the opening angle α of the chip flute (see FIG. 8) amounts in the example to 84°, and the angle of divergence β of the bar 7 to 96°. In practice, said angles may vary provided that α does not exceed 88°. On the other hand, α should amount to at least 80°. Suitably, α is within the interval of 82-86°. An instrumental factor to the total strength of the drill is the angle of divergence β of the bar. Because this is great, more precisely greater than the opening angle of the chip flutes, a comparatively great amount of material will be concentrated to the periphery of the bars. In such a way, a good strength is imparted to the drill in spite of the minimal core diameter DC.

Further Elucidation of Prior Art:

A twist drill intended for short hole drilling and having similarities to the drill according to the invention is previously known from EP 2076344 B1. In this case, the opening angle of the individual chip flute is per se smaller than the angle of divergence of the bar, but not for the chips to be held enclosed as far inside the drill as possible, but so as to allow forming the cutting edge so that this divides the chip into two parallel part chips. In doing so, the diameter of the drill core is even greater than 25% and amounts, in the embodiment example, to approx. 33% of the drill diameter. This means that the tendency of the chip flow to be pressed out radially against the hole wall should become even greater than in the KENNAMETAL drill described above.

Figure 18:
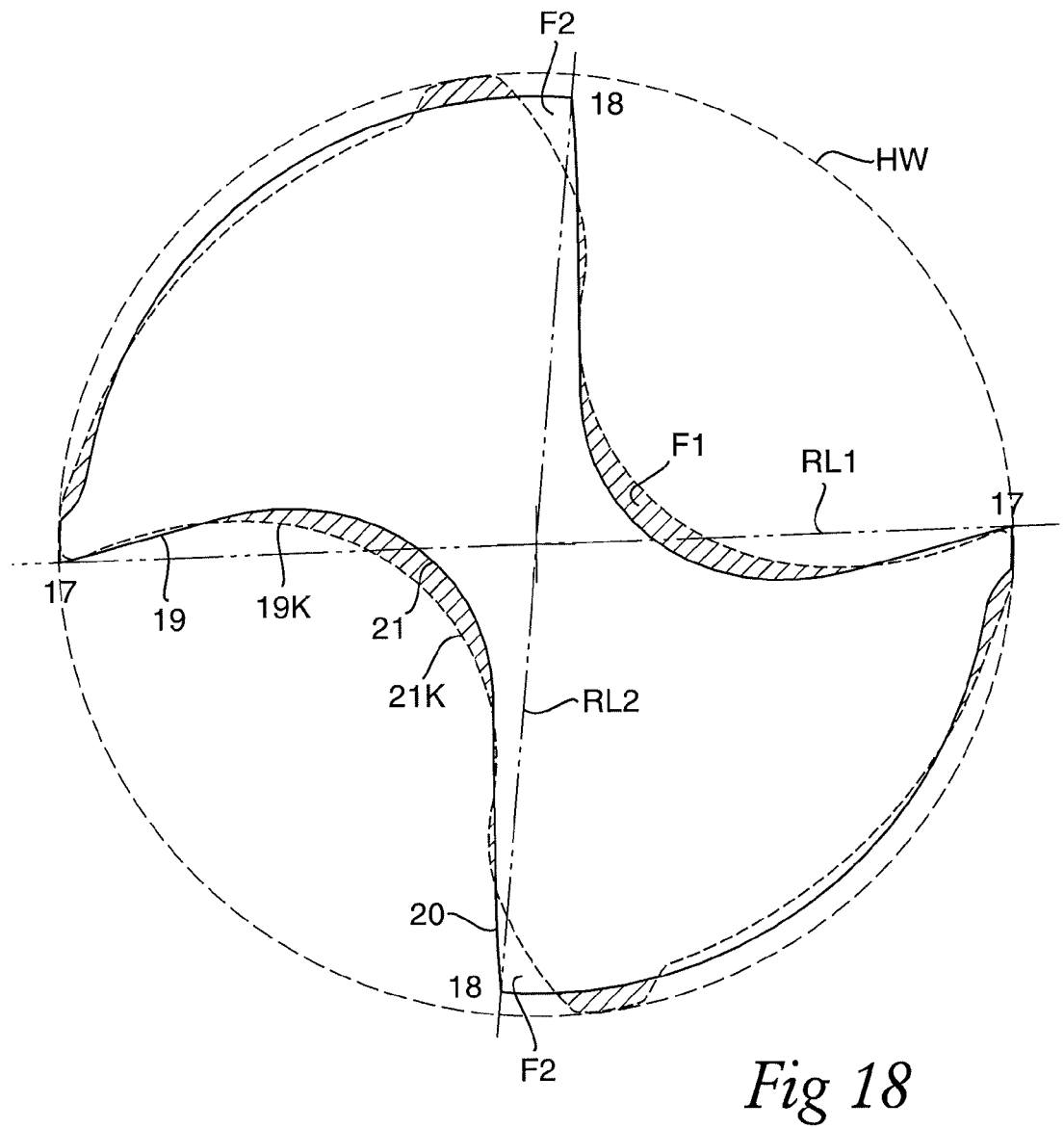
FIG. 18 is a picture in which FIGS. 8 and 15 have been superimposed on each other to show the differences between the cross-sectional shapes of the respective drills.

The Function and Advantages of the Invention:

Reference is now made to FIG. 18, in which the cross-sectional shapes of an exemplary embodiment of a disclosed drill (solid) and the known drill from KENNAMETAL (dashed), respectively, are shown overlaid each other (cf. FIGS. 7 and 15). A first difference between the drills is illustrated by the crescent-like field F1 adjacent to the frontal and bottom surfaces 19, 21 of the chip flutes in the respective drills. In this area, the chip flute of the drill according to the invention cuts in considerably deeper into the drill body than the chip flute of the known drill. This is a consequence of the core 9 of the first-mentioned one having a smaller diameter DC than the one of the last-mentioned one. Another difference is illustrated by the wedge-like field F2 that shows how the tangential extension of the chip flute according to the invention between the border edges 17, 18 is considerably smaller than the corresponding distance in the known drill. Generally, the chip flute according to the invention may be said to be radially deeper as well as tangentially more compressed than the known flute. In addition, the main edge 13K (see FIG. 16) of the known drill, i.e., the outer part of the entire cutting edge 11K that extends from the knee 14K out to the periphery is slightly C-shaped, more precisely as a consequence of the frontal surface 19K of the chip flute having the same concave curvature as the deepest situated (although fairly shallow) bottom surface 21K. Thus, these surfaces 19K, 21K transform boundlessly into each other. Contrary to this, the main edge 13 (see FIG. 9) of the drill according to the invention is J-shaped as a consequence of the frontal and bottom surfaces 19, 21 having different curvature and being delimited from each other via the boundary line 22. More precisely, the outer edge segment 13a will be essentially straight (if $r_1$ is selected near infinity), while the inner edge segment 13b becomes arched as a consequence of the bottom surface 21 being markedly concave with the radius $r_3$. As a consequence of the slight C-shape of the main edge 13K, the chip being removed and, after convolution, broken into pieces against itself will be directed radially outward to a greater extent than the chip removed by means of the main edge 13 of the drill according to the invention, which, thanks to the J-shape of the main edge, will move in a path directed further in inside the chip flute. This tendency to movements will also be maintained when the chips have been entirely released and begin to be evacuated via the chip channels, i.e., the space contained between the flute wall and the hole wall HW. While the entirely concave frontal surface 19K presses the chips out fairly intensively against the hole wall, the (straight) frontal surface 19 extending between the boundary line 22 and the periphery will direct the chip flow more inward in the chip channel. In other words, the chips in the last-mentioned case will not hammer against the hole wall.

In this connection, reference is made especially to FIG. 16, in which it is seen that the main edge 13K is comparatively short in relation to the centre cutting edge 12K, more precisely as a consequence of the radial distance between the knee 14K and the centre of the drill being considerably greater than the corresponding distance in the drill according to the invention. In the first-mentioned case, the radial distance between the knee 14K and the centre axis C amounts accordingly to approx. 40% of D/2, while in the last-mentioned case, the corresponding radial distance amounts to only 23% of D/2. This means that the comparatively blunt-cutting centre cutting edge 12K of the known drill will sweep over a comparatively great part of the hole bottom surface. As pointed out previously, the centre surface of exemplary embodiments of a drill is only approx. 1/25 of the entire hole bottom surface, while the corresponding fraction of the known drill amounts to approx. 4/25. In other words, the known drill requires considerably more energy than the one disclosed herein.

In FIG. 17, it is seen that the clearance surfaces 10K are ground into a single step, while the corresponding clearance surfaces 10 of the disclosed drill are ground into several steps while forming the facet-like part surfaces 10a, 10b, 10c. Such facet grinding increases the strength of the drill tip significantly.

In exemplary embodiments of the disclosed drill, the centre cutting edge has a length that amounts to approx. 20% of the total length of the cutting edge 11, implying that the main edge 13 has a length that amounts to 80% of the total length. The arc length of the two edge segments 13a, 13b that are included in the main edge may vary. For small drills, the arc lengths of the respective edge segment may be approximately equally large (50/50). In greater drills, e.g. having a drill diameter greater than 10 mm, the straight edge segment 13a may, however, be longer than the curved edge segment 13b, e.g. at a ratio of 60/40 or even 70/30.

In the shown prototype embodiment, the radius $r_3$ of the flute bottom surface 21 amounts to 6 mm. This radius may, however vary upward as well as downward. However, $r_3$ should amount to at most 10 mm and at least 4 mm. Furthermore, at least $r_1$ should approach infinity to give the outer edge segment 13a a straight shape. Within the scope of the invention, it is, however, feasible to impart a slightly curved or cambered shape to said edge segment, by giving the frontal surface 19 a large radius $r_1$, e.g. 40 mm or more. With a particular reference to FIG. 9, it should be pointed out that the centre cutting edge 12 and the outer edge segment 13a of the main edge run essentially parallel to each other (possible deviations from parallelism should not be more than 3°).

Feasible Modifications of the Invention:

In the drawings, the disclosed drill has been exemplified in the form of a solid drill, i.e., a drill that is formed in a single piece, preferably of cemented carbide or steel. However, it is also feasible to realize the described geometry of the drill tips by manufacturing the drill in a so-called loose top embodiment, i.e., in an embodiment in which the cutting edges are formed in a replaceable, front seat part or loose top, which in turn is mountable in a front seat in a basic body.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A drill, comprising:
   front and rear ends;
   a centre axis (C) extending between the front and rear ends and peripheral envelope surface that is concentric with the centre axis, wherein the front end is formed as a tip having an obtuse nose angle (ε);
   two chip flutes countersunk in the peripheral envelope surface, which flutes are situated between a pair of bars and run helicoidally at a certain pitch angle (φ) around a central core, and individually are delimited by a chute-shaped flute wall situated between a pair of parallel border edges, a first border edge heading in the direction of rotation of the drill and a second border edge trailing,
   wherein:
   a) a cutting edge extends from the centre axis (C) to the periphery and includes a main edge formed by an intersection between the individual chip flute and a clearance surface included in the tip and a center cutting edge oriented at the nose angle (ε),
   b) the flute wall includes a frontal surface that is situated closest to the first border edge and extends axially rearward from the main edge included in the cutting edge, and a trailing surface situated closest to the second border edge, which trailing surface transforms into the frontal surface via a concavely arched bottom surface and extends rearward from a web thinning formed in the tip and located adjacent to the centre cutting edge, which transforms into the main edge at a knee, wherein the centre cutting edge is shorter than the main edge and wherein, in a view perpendicular to the centre axis (C), a projection of an imaginary line extending from the centre cutting edge intersects the centre axis (C) at a first axial position and a projection of an imaginary line extending from the main edge intersects the centre axis (C) at a second axial position that is axially rearward from the first axial position, c) a radial angle (δ) between the frontal surface and a radial reference line (RL1) between the centre axis (C) and the first border edge is positive so far that the frontal surface is situated rotationally behind the reference line, d) the individual chip flute has an opening angle (α)—counted as the angle between the first reference line (RL1) and a second reference line (RL2) between the centre axis (C) and the second border edge, with which an angle of divergence (β) of the individual bar forms the supplementary angle, e) the core has a diameter (DC) that amounts to at most 22% of the drill diameter (D), f) the angle of divergence (β) of the bar is greater than the opening angle (α) of the chip flute, g) the frontal and trailing surfaces of the individual flute wall are delimited from the bottom surface via helicoidal boundary lines located at a change in radii of curvature between the frontal and trailing surfaces and the bottom surface, and the frontal and trailing surfaces have radii of curvature ($r_1$, $r_2$) as viewed in a plane perpendicular to the centre axis that are at least three times greater than the radius ($r_3$) of the bottom surface, and h) a first boundary line, positioned closest to the first border edge, meeting the main edge in a meeting point that divides the same into two edge segments, an inner edge segment positioned closest to the centre cutting edge has a smaller radius of curvature than an outer edge segment positioned furthest from centre cutting edge.

2. The drill according to claim 1, wherein the opening angle (α) of the chip flute amounts to at most 88°.

3. The drill according to claim 1, wherein the width of the frontal surface between the first border edge and the first boundary line is smaller than the corresponding width of the trailing surface between a second boundary line and the second border edge.

4. The drill according to claim 1, wherein the outer edge segment of the main edge is approximately straight by the radius of curvature ($r_1$) of the frontal surface approaching infinity.

5. The drill according to claim 1, wherein the radius of curvature ($r_2$) of the trailing surface approaches infinity and a rotationally rear boundary line between the clearance surface and the trailing surface is straight.

6. The drill according to claim 1, wherein the radius of curvature ($r_3$) of the bottom surface is smaller than 10 mm.

7. The drill according to claim 1, wherein the inner-edge segment of the main edge is arched and has a length between the knee and the meeting point of the first boundary line along the main edge that is not greater than a length of the outer edge segment of the main edge between the meeting point of the first boundary line along the main edge and a meeting point of the main edge and a border edge.

8. The drill according to claim 1, wherein the positive radial angle (δ) between the first reference line (RL1) and a radially outer edge segment of the main edge formed where the frontal surface meets the main cutting edge amounts to at least 5°.

9. The drill according to claim 1, wherein the centre cutting edge and the outer edge segment of the main edge formed where the frontal surface meets the main cutting edge run approximately parallel to each other.

10. The drill according to claim 1, wherein clearance surfaces of the drill comprise several steps.

11. The drill according to claim 1, wherein clearance surfaces of the drill comprise a plurality of faceted surfaces.

12. The drill according to claim 1, wherein the centre cutting edge has a length that is approximately 20% of a total length of the cutting edge.

13. The drill according to claim 6, wherein the radius of curvature ($r_3$) of the bottom surface is at least 4 mm.

14. The drill according to claim 1, wherein the centre cutting edge and the outer edge segment of the main edge are parallel within 3 degrees to each other.

15. A drill, comprising:
front and rear ends;
a centre axis (C) extending between the front and rear ends and peripheral envelope surface that is concentric with the centre axis, wherein the front end is formed as a tip having an obtuse nose angle (c);
two chip flutes countersunk in the peripheral envelope surface, which flutes are situated between a pair of bars and run helicoidally at a certain pitch angle (φ) around a central core, and individually are delimited by a chute-shaped flute wall situated between a pair of parallel border edges, a first border edge heading in the direction of rotation of the drill and a second border edge trailing, wherein:

a) a cutting edge extends from the centre axis (C) to the periphery and includes a main edge formed by an intersection between the individual chip flute and a clearance surface included in the tip and a center cutting edge oriented at the nose angle (ε), b) the flute wall includes a frontal surface that is situated closest to the first border edge and extends axially rearward from the main edge included in the cutting edge, and a trailing surface situated closest to the second border edge, which trailing surface transforms into the frontal surface via a concavely arched bottom surface and extends rearward from a web thinning formed in the tip and located adjacent to the centre cutting edge, which transforms into the main edge at a knee, wherein the centre cutting edge is shorter than the main edge and wherein the centre cutting edge intersects the centre axis at a first axial position and a projection of an imaginary line extending from the main edge intersects the centre axis at a second axial position that is different from the first axial position, c) a radial angle (6) between the frontal surface and a radial reference line (RL1) between the centre axis (C) and the first border edge is positive so far that the frontal surface is situated rotationally behind the reference line, d) the individual chip flute has an opening angle (α)—counted as the angle between the first reference line (RL1) and a second reference line (RL2) between the centre axis (C) and the second border edge, with which an angle of divergence (β) of the individual bar forms the supplementary angle, e) the core has a diameter (DC) that amounts to at most 22% of the drill diameter (D), f) the angle of divergence (β) of the bar is greater than the opening angle (α) of the chip flute, g) the frontal and trailing surfaces of the individual flute wall are delimited from the bottom surface via helicoidal boundary lines located at a change in radii of curvature between the frontal and trailing surfaces and the bottom surface, and the frontal and trailing surfaces have radii of curvature ($r_1$, $r_2$) as viewed in a plane perpendicular to the centre axis that are at least three times greater than the radius ($r_3$) of the bottom surface, and h) a first boundary line, positioned closest to the first border edge, meeting the main edge in a meeting point that divides the same into two edge segments, an inner edge segment positioned closest to the centre cutting edge has a smaller radius of curvature than an outer edge segment positioned furthest from centre cutting edge, and wherein the centre cutting edge and the outer edge segment of the main edge are parallel within 3 degrees to each other.

16. The drill according to claim 15, wherein the width of the frontal surface between the first border edge and the first boundary line is smaller than the corresponding width of the trailing surface between a second boundary line and the second border edge.

17. The drill according to claim 15, wherein the inner-edge segment of the main edge is arched and has a length between the knee and the meeting point of the first boundary line along the main edge that is not greater than a length of the outer edge segment of the main edge between the meeting point of the first boundary line along the main edge and a meeting point of the main edge and a border edge.

18. The drill according to claim 15, wherein clearance surfaces of the drill comprise several steps.

19. The drill according to claim 15, wherein clearance surfaces of the drill comprise a plurality of faceted surfaces.

20. The drill according to claim 15, wherein the centre cutting edge has a length that is approximately 20% of a total length of the cutting edge.

\* \* \* \* \*